United States Patent
Rosanuru et al.

(10) Patent No.: US 11,711,406 B2
(45) Date of Patent: Jul. 25, 2023

(54) SYSTEMS AND METHODS FOR PROVIDING DYNAMIC AND INTERACTIVE CONTENT IN A CHAT SESSION

(71) Applicant: PAYPAL, INC., San Jose, CA (US)

(72) Inventors: Ramakrishna Rosanuru, Chennai (IN); Ragunath Jayabalakrishnan, Austin, TX (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/940,063

(22) Filed: Jul. 27, 2020

(65) Prior Publication Data

US 2021/0006609 A1     Jan. 7, 2021

Related U.S. Application Data

(63) Continuation of application No. 16/164,351, filed on Oct. 18, 2018, now Pat. No. 10,728,294.

(51) Int. Cl.
*H04L 29/06*     (2006.01)
*G06F 3/0481*     (2022.01)
(Continued)

(52) U.S. Cl.
CPC .......... *H04L 65/403* (2013.01); *G06F 3/0481* (2013.01); *G06F 40/205* (2020.01); *G06Q 20/407* (2013.01); *G06Q 30/016* (2013.01)

(58) Field of Classification Search
CPC . H04L 65/403; G06F 3/0481; G06F 17/2705; G06Q 20/407; G06Q 30/016
See application file for complete search history.

(56) References Cited

U.S. PATENT DOCUMENTS

| | | | |
|---|---|---|---|
| 6,718,313 B1 * | 4/2004 | Lent .............. | G06Q 30/06 715/749 |
| 6,871,213 B1 * | 3/2005 | Graham .......... | H04L 67/02 709/204 |

(Continued)

FOREIGN PATENT DOCUMENTS

| | | | | |
|---|---|---|---|---|
| EP | 2166506 A2 * | 3/2010 | ............. | H04L 51/04 |
| WO | WO-03085539 A1 * | 10/2003 | ........ | H04M 3/42127 |

OTHER PUBLICATIONS

Salesforce, "Block Sensitive Data in Chats", published on Sep. 27, 2015 to https://help.salesforce.com/s/articleView?id=sf.live_agent_block_sensitive_data.htm&type=5, retrieved on Jul. 27, 2022. (Year: 2015).*

(Continued)

*Primary Examiner* — Shourjo Dasgupta
(74) *Attorney, Agent, or Firm* — Haynes and Boone, LLP

(57) ABSTRACT

Methods and systems are presented for providing dynamic and interactive content in an online chat session. When it is determined that an online chat session is established between two devices, an interactive chat engine may begin monitoring chat messages exchanged between the devices to derive a context for the online chat session. A particular workflow from multiple workflows may be selected and initiated for the online chat session based on the derived context. The interactive chat engine may generate a chat object for presenting dynamic and interactive content to the user related to the workflow within the online chat session. The chat object may be inserted into the chat flow of the online chat session. Once inserted the chat object may generate and subsequently modify presentations for the devices participating in the online chat session.

21 Claims, 8 Drawing Sheets

(51) Int. Cl.
*G06Q 20/40* (2012.01)
*G06Q 30/00* (2023.01)
*H04L 65/403* (2022.01)
*G06Q 30/016* (2023.01)
*G06F 40/205* (2020.01)

(56) References Cited

U.S. PATENT DOCUMENTS

| | | | |
|---|---|---|---|
| 10,692,147 B1* | 6/2020 | Ruble | G06Q 40/025 |
| 10,749,970 B1* | 8/2020 | Fisi | H04L 67/22 |
| 2003/0084339 A1* | 5/2003 | Roginsky | G06F 21/6245 |
| | | | 726/4 |
| 2004/0003041 A1* | 1/2004 | Moore | G10L 13/00 |
| | | | 709/204 |
| 2005/0004864 A1* | 1/2005 | Lent | G06Q 40/02 |
| | | | 705/38 |
| 2007/0174417 A1* | 7/2007 | Bostick | H04L 51/04 |
| | | | 709/217 |
| 2008/0021816 A1* | 1/2008 | Lent | G06Q 40/02 |
| | | | 705/38 |
| 2008/0288382 A1 | 11/2008 | Smith | |
| 2008/0305815 A1* | 12/2008 | McDonough | H04M 3/493 |
| | | | 455/466 |
| 2010/0070292 A1* | 3/2010 | Kenedy | G06Q 40/08 |
| | | | 705/40 |
| 2010/0083143 A1* | 4/2010 | Bigley | G06Q 30/02 |
| | | | 715/758 |
| 2012/0036452 A1* | 2/2012 | Coleman | G06F 21/55 |
| | | | 715/751 |
| 2012/0054095 A1* | 3/2012 | Lesandro | G06F 9/452 |
| | | | 705/39 |
| 2013/0232074 A1 | 9/2013 | Carlson | |
| 2014/0012740 A1* | 1/2014 | Carson | G06Q 40/00 |
| | | | 705/39 |
| 2014/0029743 A1* | 1/2014 | Blodgett | H04M 3/5133 |
| | | | 379/265.09 |
| 2014/0143234 A1* | 5/2014 | Scherpa | H04L 51/04 |
| | | | 707/722 |
| 2014/0279050 A1* | 9/2014 | Makar | G06F 16/9535 |
| | | | 705/14.66 |
| 2014/0337440 A1* | 11/2014 | Callanan | H04L 12/1831 |
| | | | 709/206 |
| 2015/0170155 A1* | 6/2015 | Truitt | G06Q 30/016 |
| | | | 705/304 |
| 2015/0227759 A1* | 8/2015 | Aniano | G06F 21/6245 |
| | | | 726/28 |
| 2015/0256675 A1* | 9/2015 | Sri | H04L 51/32 |
| | | | 379/265.09 |
| 2015/0269575 A1* | 9/2015 | Narayanan | H04L 12/1822 |
| | | | 705/75 |
| 2015/0281436 A1* | 10/2015 | Kumar | H04M 3/5166 |
| | | | 379/68 |
| 2015/0281445 A1* | 10/2015 | Kumar | H04M 3/5175 |
| | | | 379/88.01 |
| 2015/0286937 A1 | 10/2015 | Hildebrand | |
| 2015/0304430 A1* | 10/2015 | Busropan | H04W 4/70 |
| | | | 709/228 |
| 2016/0036869 A1* | 2/2016 | Logan | H04M 3/5141 |
| | | | 379/265.09 |
| 2016/0036973 A1* | 2/2016 | Harasimiuk | H04M 3/5191 |
| | | | 379/265.13 |
| 2016/0134568 A1* | 5/2016 | Woo | H04L 51/02 |
| | | | 709/206 |
| 2016/0285799 A1* | 9/2016 | Andreev | H04L 51/02 |
| 2016/0294952 A1* | 10/2016 | Bodell | H04L 67/146 |
| 2016/0371701 A1* | 12/2016 | Mirza | H04L 65/1089 |
| 2016/0379010 A1* | 12/2016 | Farkash | G06F 21/6245 |
| | | | 726/1 |
| 2017/0053066 A1* | 2/2017 | Kukreja | G16H 70/40 |
| 2017/0090853 A1* | 3/2017 | Khalatian | G06F 9/542 |
| 2017/0103362 A1 | 4/2017 | Choi | |
| 2017/0104876 A1* | 4/2017 | Hibbard | H04M 3/5141 |
| 2017/0134316 A1* | 5/2017 | Cohen | H04L 51/216 |
| 2018/0004375 A1* | 1/2018 | Friend | G06F 3/0484 |
| 2018/0007081 A1* | 1/2018 | Friend | H04L 63/1441 |
| 2018/0039621 A1 | 2/2018 | Sronce | |
| 2018/0096427 A1 | 4/2018 | Pierce | |
| 2018/0131643 A1* | 5/2018 | Trufinescu | G06F 3/048 |
| 2018/0315051 A1 | 11/2018 | Hurley | |
| 2018/0341396 A1* | 11/2018 | Yaseen | G10L 15/22 |
| 2019/0095524 A1* | 3/2019 | Rodgers | G06F 16/3329 |
| 2019/0124030 A1 | 4/2019 | Pierce | |

OTHER PUBLICATIONS

Date-constrained Google Search result for Amazon Connect, indexed to the search engine on Mar. 28, 2017, retrieved on Jul. 27, 2022. (Year: 2017).*
Acquire, "Secure Cobrowsing Software for Customer Support Teams", published on Feb. 28, 2018 to https://acquire.io/co-browsing, retrieved on Jul. 27, 2022. (Year: 2018).*
IP dot com Search Results page for AU 784512 B2, retrieved from www.IP.com on Mar. 2, 2023. (Year: 2006).*
IP dot com Search Results page for JP 2002183064 A, retrieved from www.IP.com on Mar. 2, 2023. (Year: 2002).*
International Application No. PCT/US2019/057076, International Preliminary Report on Patentability dated Apr. 29, 2021, 10 pages.
International Appl. No. PCT/US2019/057076, International Search Report and Written Opinion dated Dec. 11, 2019, 12 pages.

* cited by examiner

SYSTEMS AND METHODS FOR PROVIDING DYNAMIC AND INTERACTIVE CONTENT IN A CHAT SESSION

CROSS REFERENCE TO RELATED APPLICATIONS

The present application is a continuation of and claims priority to U.S. patent application Ser. No. 16/164,351, filed Oct. 18, 2018, which is incorporated herein in its entirety.

BACKGROUND

The present specification generally relates to facilitating an online chat session, and more specifically, to providing dynamic and interactive content in an online chat session according to various embodiments of the disclosure.

RELATED ART

Service providers that provide services (e.g., purchases of goods, payment transactions, etc.) to customers often enable their customers to initiate direct communication with the service providers via one or more media or communication channels. For example, a customer may contact the service provider directly via phone or e-mail. However, these traditional communication channels suffer from multiple disadvantages. E-mail communication prevents the customers from receiving real-time feedback from the service provider. Calling the service provider via phone may require a long waiting time. Furthermore, certain information, such as transaction identifiers, may be difficult to communicate verbally over the phone, and thus, may be error-prone. As such, it has become increasingly popular for service providers to enable customers to communicate directly with them via an online chat session.

Through an online chat client program, such as a mobile chat program or a chat client that is embedded within a service provider's website, etc., a customer may conduct a real-time conversation with the service provider. Through a dialogue (e.g., exchanges of chat messages), the service provider may quickly collect sufficient information from the customer to address the issue(s) raised by the customer. Unfortunately, conventional online chat sessions are far from ideal, as customers still experience friction in exchanging information with the service provider during an online chat session. For example, an online chat client program is often detached from another program (e.g., a web browser) where the customer may retrieve information related to the conversation. For example, when asked to identify a transaction for which the customer wants to dispute, the customer often has to open another program or window (e.g., another browser window), log-in to her account through the separate window, retrieve the necessary information, and copy the information onto the chat client program to be transmitted to the service provider. This process is burdensome and also prone to error. Thus, there is a need for providing an improved online chat environment that reduces such friction in facilitating an exchange of information in an online chat session with a customer.

Figure 1:
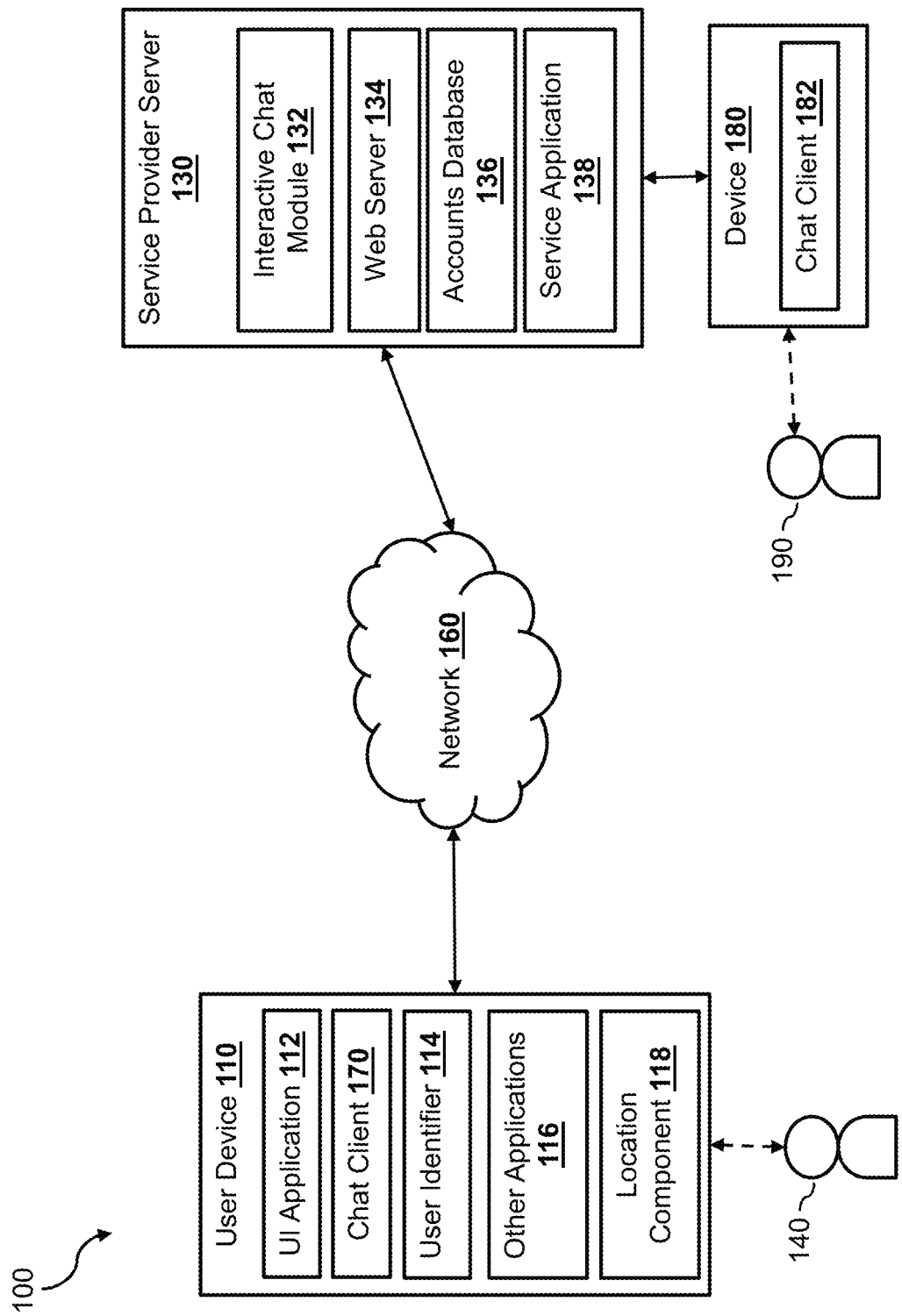
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes methods and systems for providing dynamic and interactive content in an online chat session. As used herein, an online chat session is defined as a sequence of messages exchanged between two devices over a network. The online chat session may be established in different ways. In some embodiments, the service provider server may provide a website on the user device (e.g., via a web browser executed on the user device), and a user of the user device may initiate the online chat session from the website (e.g., by initiating a chat client embedded within the website). In such embodiments, in response to an input by the user on the website, the chat client embedded within the website may be activated to initiate a new online chat session. In other embodiments, the user may use a third-party chat client (e.g., Facebook® Messenger, WhatsApp®, iMessages®, etc.) to initiate a chat session with the service provider server.

The online chat session may be conducted by the user and an entity associated with the service provider (e.g., an employee of the service provider, a robot associated with the service provider, etc.), and may include a chat flow that includes all of the messages exchanged during the online chat session and their metadata. For example, the chat flow may include a content of the message and information that indicates, for each message, a sender of the message and a timestamp representing a time that the message was transmitted. As such, the chat flow may represent a sequence of messages exchanged during the online chat session over a timeline.

When it is determined that an online chat session is established between a user device and a service provider server associated with a service provider, an interactive chat engine may begin monitoring chat messages exchanged between the user device and the service provider server. The interactive chat engine may include a chat server for facilitating the online chat session between the user device and the service provider server, and as such, the interactive chat engine may monitor the messages exchanged between the devices. Alternatively, the interactive chat engine may intercept messages transmitted between the chat clients. The interactive chat engine may then generate and maintain a chat flow for the online chat session.

In some embodiments, the interactive chat engine may derive a chat environment based on the chat client used by the user. For example, the interactive chat engine may determine a chat client type (e.g., a chat client embedded within the website, a third-party chat client program, etc.) of the chat client, and a set of capabilities of the chat client (e.g., whether the chat client supports presentation of rich context, etc.). Furthermore, the interactive chat engine may also derive a chat context based on the messages exchanged during the online chat session. For example, the interactive chat engine may parse the messages being exchanged during the online chat session to determine the chat context (e.g., the user wants to dispute a transaction, the user wants to receive a refund for a transaction, the user requests a one-time password, the user needs assistance in performing a function on the website, etc.) of the online chat session.

Once the chat context is derived, the interactive chat engine may select, from multiple workflows, a particular workflow, and initiate the selected workflow for the online chat session. For example, when the derived chat context indicates that the user wants to file a dispute of a transaction, the interactive chat engine may select and initiate the transaction dispute workflow for the user based on the chat context. When the derived chat context indicates that the user has a question regarding using a particular function on the website, the interactive chat engine may select and initiate an inquiry workflow for the user based on the chat context.

Each workflow may include multiple states. For example, the transaction dispute workflow may include a 'start' (or an 'opened') state indicating that a corresponding transaction dispute has just been initiated by the user, a 'transaction selection' state indicating that a transaction is being selected for filing a dispute, an 'under review' state indicating that the transaction dispute is under review, an 'inquiry' state indicating that additional information is needed from the user to complete the review of the transaction dispute, a 'reviewed' state indicating that the review of the transaction dispute is completed and a corresponding result (e.g., approved or deny) may be associated with the transaction dispute, and a 'closed' state indicating that the transaction dispute is closed. In an example in which the interactive chat engine initiates the transaction dispute workflow for the user, the interactive chat engine may assign a 'start' state to the user.

In addition to initiating the workflow, the interactive chat engine may generate a chat object (also referred to as an "interactive object") for presenting dynamic and interactive content to the user related to the workflow within the online chat session. In some embodiments, the chat object may include a data structure storing data associated with the user and the workflow. For example, the chat object may include an account identifier identifying an account associated with the user, a workflow identifier identifying the workflow that has been initiated for the user, and a current state within the workflow. Using the example given above, the interactive chat engine may insert an account number associated with the user, a workflow identifier that identifies the transaction dispute workflow, and the 'start' state into the chat object.

The interactive chat engine may then insert the chat object into the chat flow of the online chat session. In some embodiments, in addition to the data structure, the chat object may also include programming instructions configured to dynamically generate and/or render a presentation for one or more chat clients and perform actions based on the data stored within the data structure. For example, when the data within the chat object indicates that the user is in a 'start' state of the transaction dispute workflow, the chat object may retrieve information related to recent transactions associated with the user based on the account identifier. The chat object may also generate a user interactive presentation for the user that includes a list of the retrieved recent transactions associated with the user for the user to select a particular transaction for the dispute. For example, each recent transaction in the user interactive presentation may be selectable by the user when rendered on the chat client of the user.

In some embodiments, the chat object may generate the user interactive presentation based on the chat environment associated with the user. For example, when it is determined that the chat client of the user is an embedded chat client embedded within the website of the service or a chat client that supports rich content, the user interactive presentation may be generated to include a first type of content (e.g., interactive elements such as HTML elements, JavaScript code, CSS, SVG, etc.). However, when it is determined that the chat client of the user does not support rich content (e.g., text only), the user interactive presentation may be generated to include a second type of content (e.g., text-based content).

The chat object may generate the user interactive presentation while residing on the service provider server, and the interactive presentation is then transmitted (e.g., pushed) to the chat client of the user as part of the chat flow of the online chat session. The chat client may then render the user interactive presentation on the chat client of the user. Alternatively, the chat object may be transmitted (e.g., pushed) to the chat client of the user as part of the online chat session. The chat object may then generate and render the user interactive presentation at a user device of the user.

The chat object may generate different (e.g., asynchronous) presentations for the different chat clients associated with the online chat session. While the chat object may generate the user interactive presentation (as discussed above) for the chat client of the user device, the chat object may generate a server presentation for the entity associated with the service provider. For example, while the chat object presents the list of recent transactions to the user, the chat object may generate a presentation that notifies the entity that a transaction is being selected by the user. This way, the entity (e.g., a service representative of the service provider) is not overwhelmed with unneeded information. Furthermore, through the asynchronous chat presentation, sensitive information of the user may also be protected. For example, before presenting the list of recent transactions of the user, the chat object may ask the user for user credentials of the account in order to access information of the account. The user may transmit the user credentials (e.g., a password) to the chat object via the interactive presentation rendered on the chat client of the user. Due to the asynchronous nature of the chat presentations generated by the chat object, the chat object may receive the user credential that the user transmitted within the online chat session, without presenting the user credential on the chat client of the entity. Instead, the chat object may generate and present a notification that indicates the user credential is being obtained on the chat client of the entity.

Once the user interactive presentation is rendered on the chat client of the user, the user may interact with the interactive presentation. For example, the user may provide input (e.g., submitting a user credential, selecting a transaction) through the user interactive presentation. Upon receiving the user input (e.g., the user selection of a transaction), the interactive chat engine and/or the chat object may update a state of the workflow and perform an action based on the updated state. For example, the interactive chat engine and/or the chat object may update the state to an 'under review' state, store an identifier for the selected transaction in the data structure of the chat object, and transmit the selected transaction to another computer process for processing a transaction dispute based on the selected transaction. Furthermore, based on the updated state, the chat object may modify the user interactive presentation. For example, instead of presenting a list of the recent transactions associated with the user, the chat object may modify the user interactive presentation to include only the transaction selected by the user. The chat object may also modify the server presentation to indicate that a transaction has been selected by the user.

In some embodiments, the chat object may also include in the server presentation information associated with the selected transaction (e.g., the date of the transaction, services or items purchased in the transaction, an amount of the transaction, etc.). Furthermore, the chat object may include a link in the server presentation that when selected by the entity, the chat object may retrieve additional detail information associated with the selected transaction and present the additional detail information on the chat client of the entity.

In some embodiments, instead of or in addition to presenting the selected transaction in the user interactive presentation, the chat object may also include a status indicator that indicates a current status of the transaction dispute workflow. The chat object may continue to obtain an updated status from the transaction dispute process and may update the user interactive presentation with the updated status accordingly. The chat object may also include the status indicator in the server presentation rendered on the chat client of the entity.

The user and the entity may continue to exchange messages during the online chat session while the respective presentation is rendered on the chat clients. For example, the user may ask additional questions related to the dispute (e.g., possible compensation, etc.) and the entity may answer those question accordingly. One benefit of using the chat object to provide dynamic and interactive content on the chat clients is that accurate and up-to-date content related to the subject matter of the conversation is readily available and presented on the chat clients. Furthermore, when a question of the user requires the entity to look for additional information, the entity may use the server presentation to retrieve the additional information (e.g., the additional information of the transaction), and as such, both parties may carry on the conversation within the chat program without the need to retrieve information from other programs or applications or otherwise be redirected away from the online chat session.

In some embodiments, the chat object and the data stored in the chat object are persistent across multiple online chat sessions. For example, since the transaction dispute process may not be immediately resolved, the user may terminate the online chat session (a first online chat session), for example, by closing the chat client. The interactive chat engine may store the chat flow including the chat object in a persistent storage (e.g., a database), and associate the chat flow with the user. When it is detected that a subsequent online chat session (a second online chat session) is established between the user and the service provider server (e.g., the user initiates another chat session), the interactive chat engine may retrieve the chat flow associated with the first online chat session. Based on the data stored in the chat object, the interactive chat engine and/or the chat object may obtain updated information (e.g., an updated status) from the corresponding workflow process indicated in the chat object. For example, when the chat object indicates a transaction dispute workflow, the interactive chat engine and/or the chat object may inquire about a corresponding transaction dispute process for an updated status for the transaction dispute of the user. The interactive chat engine and/or the chat object may then update the status in the chat object with the updated information (e.g., update the status to "reviewed" and inserting the result such as approved or deny in the chat object).

The chat object may then generate a new interactive presentation based on the updated information. For example, the chat object may generate the interactive presentation that indicates the updated status of "reviewed" and the result (e.g., approved or deny) and render the interactive presentation in the chat client of the user and/or the chat client of the entity.

The interactive chat engine and the chat object generated by the interactive chat engine enables efficient communication between the user (the customer of the service provider) and the service provider. Furthermore, since the entity who is engaged with the communication with the user during the online chat session can hand off tasks (including initiating the corresponding workflow and interactions with the user) to the chat object, the interactive chat engine according to various embodiments enables the entity to handle multiple online chat sessions with multiple users simultaneously.

FIG. 1 illustrates an electronic transaction system 100 within which the interactive chat engine may be implemented according to one embodiment of the disclosure. The electronic transaction system 100 includes a service provider server 130 associated with a service provider and a user device 110 that may be communicatively coupled with each other via a network 160. The service provider server 130 may be communicatively coupled with a device 180 directly or via an internal network associated with the service provider. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the service provider server 130 and/or other user devices similar to the user device 110 over the network 160. For example, the user 140 may use the user device 110 to log in to a user account with the service provider to access account services or conduct electronic transactions (e.g., account transfers or payments, purchase goods and/or services, sales of goods and/or services, receive payments of the sale, etc.) with the service provider server 130. Furthermore, the user 140 represented here may be a natural person, a group of people, a community, and/or a business entity. Examples of business entities include merchant sites, resource information sites, utility sites, real estate management sites, social networking sites, etc., which offer various items for purchase and process payments for the purchases.

The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser), which may be utilized by the user 140 to conduct electronic transactions (e.g., selling, shopping, purchasing, bidding, etc.) with the service provider server 130 over the network 160. In one aspect, purchase expenses may be directly and/or automatically debited from the user account related to the user 140 via the user interface application 112. Similarly, sales receipts may be directly and/or automatically credited to the user account associated with the user 140.

In one implementation, the user interface application 112 includes a software program, such as a graphical user interface (GUI), executable by a processor that is configured to interface and communicate with the service provider server 130 via the network 160. In another implementation, the user interface application 112 includes a browser module that provides a network interface to browse information available over the network 160. For example, the user interface application 112 may be implemented, in part, as a web browser to view information available over the network 160.

The user device 110 may also include a chat client 170 for facilitating online chat sessions with another chat client (e.g., the chat client 182 of the device 180). The chat client 170 may be a software application executed on the user device 110 for providing a chat client interface for the user 140 and for exchanging (e.g., transmitting and receiving) messages with the other chat client. For example, during an online chat session with the chat client 182, the chat client 170 may present a chat interface that enables the user 140 to input data (e.g., text data, audio data, multi-media data, etc.) for transmitting to the chat client 182. The chat interface may also present messages that are received from the chat client 182, and messages that have been transmitted to the chat client 182. In some embodiments, the messages may be presented on the chat client interface in a chronological order according to a chat flow of the online chat session. The chat client 170 may be an embedded application that is embedded within another application, such as the UI application 112. Alternatively, the chat client 170 may be a stand-alone chat client program (e.g., a mobile app such as WhatsApp®, Facebook® Messenger, iMessages®, etc.) that is detached from any other software applications executed on the user device 110.

The user device 110, in various embodiments, may include other applications 116 as may be desired in one or more embodiments of the present disclosure to provide additional features available to the user 140. For example, the applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. The identifier 114 may include one or more attributes related to the user 140 of the user device 110, such as personal information related to the user (e.g., one or more user names, passwords, photograph images, biometric IDs, addresses, phone numbers, social security number, etc.) and banking information and/or funding sources (e.g., one or more banking institutions, credit card issuers, user account numbers, security data and information, etc.). In various implementations, the identifier 114 may be passed with a user login request to the service provider server 130 via the network 160, and the identifier 114 may be used by the service provider server 130 to associate the user with a particular user account maintained by the service provider server 130.

In various implementations, the user 140 is able to input data and information into an input component (e.g., a keyboard) of the user device 110 to provide user information with a transaction request, such as a login request, a fund transfer request, a request for adding an additional funding source (e.g., a new credit card), or other types of request. The user information may include user identification information.

The user device 110, in various embodiments, includes a location component 118 configured to determine, track, monitor, and/or provide an instant geographical location of the user device 110. In one implementation, the geographical location may include GPS coordinates, zip-code information, area-code information, street address information, and/or various other generally known types of location information. For example, the location information may be automatically obtained and/or provided by the user device 110 via an internal or external monitoring component that utilizes a global positioning system (GPS), which uses satellite-based positioning, and/or assisted GPS (A-GPS), which uses cell tower information to improve reliability and accuracy of GPS-based positioning. In other embodiments, the location information may be automatically obtained without the use of GPS. In some instances, cell signals or wireless signals are used. For example, location information may be obtained by checking in using the user device 110 via a check-in device at a location, such as a beacon. This helps to save battery life and to allow for better indoor location where GPS typically does not work.

Even though only one user device 110 is shown in FIG. 1, it has been contemplated that one or more user devices (each similar to user device 110) may be communicatively coupled with the service provider server 130 via the network 160 within the system 100.

The service provider server 130, in one embodiment, may be maintained by an online service provider, which may provide services (e.g., selling of merchandise processing, performing electronic transactions, etc.). As such, the service provider server 130 may include a service application 138, which may be adapted to interact with the user devices (such as the user device 110) over the network 160 to facilitate the searching, selection, purchase, payment of items, and/or other services offered by the service provider server 130. In one example, the service provider server 130 may be provided by PayPal®, Inc., of San Jose, Calif., USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include a web server 134 that is configured to serve web content to users in response to HTTP requests. As such, the web server 134 may include pre-generated web content ready to be served to users. For example, the web server 134 may store a log-in page, and is configured to serve the log-in page to users for logging into user accounts of the users to access various service provided by the service provider server 130. The web server 134 may also include other webpages associated with the different services offered by the service provider server 130. As a result, a user may access a user account associated with the user and access various services offered by the service provider server 130, by generating HTTP requests directed at the service provider server 130.

The service provider server 130, in one embodiment, may be configured to maintain one or more user accounts (e.g., a buyer account, a seller account, etc.) in an account database 136, each of which may include account information associated with one or more users (e.g., the user 140 associated with user device 110). For example, account information may include private financial information of users and merchants, such as one or more account numbers, passwords, credit card information, banking information, digital wallets used, transaction history, or other types of financial information. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130.

The service provider server 130 may also include an interactive chat module 132 that implements the functionality of the interactive chat engine as disclosed herein. In some embodiments, the interactive chat module 132 comprises a chat server for facilitating and managing online chat sessions between chat clients (e.g., the chat clients 170 and 182). For example, when the interactive chat module 132 receive one or more messages transmitted from one of the chat clients 170 and 182, the interactive chat module 132 may process the messages and then transmit one or more corresponding messages to the other one of the chat clients 170 and 182 to be displayed on the corresponding chat interface. The interactive chat module 132 of some embodiments may also manage the chat flows of the online chat sessions. For example, as the interactive chat module 132 receives the one or more messages received from the chat clients 170 and 182 during an online chat session, the interactive chat module 132 may record the messages in the chat flow associated with the online chat session. The interactive chat module 132 may also store the chat flow in a persistent storage such that the chat flow may be accessed subsequently even after the online chat session is terminated. As disclosed herein, the interactive chat module 132 may also monitor the messages transmitted during the online chat session, derive a context for the online chat session, and generate and insert a chat object in the chat flow of the online chat session according to various embodiments of the disclosure. The chat object may then provide dynamic and interactive content to be rendered in the chat clients 170 and 182. In some embodiments, the chat object may present different content to the chat clients 170 and 182.

As discussed above, a device 180 may be communicatively coupled with the service provider server 130. The device 180 may be operated by an entity 190 such as a person (e.g., an employee of the service provider) or a robot. The device 180 may include a chat client 182 that is similar to the chat client 170, which enable the entity 190 to generate and transmit messages to another chat client (e.g., the chat client 170) and view messages generated by the chat client 170 and content generated by the interactive chat module 132, as part of an online chat session.

Figure 2:
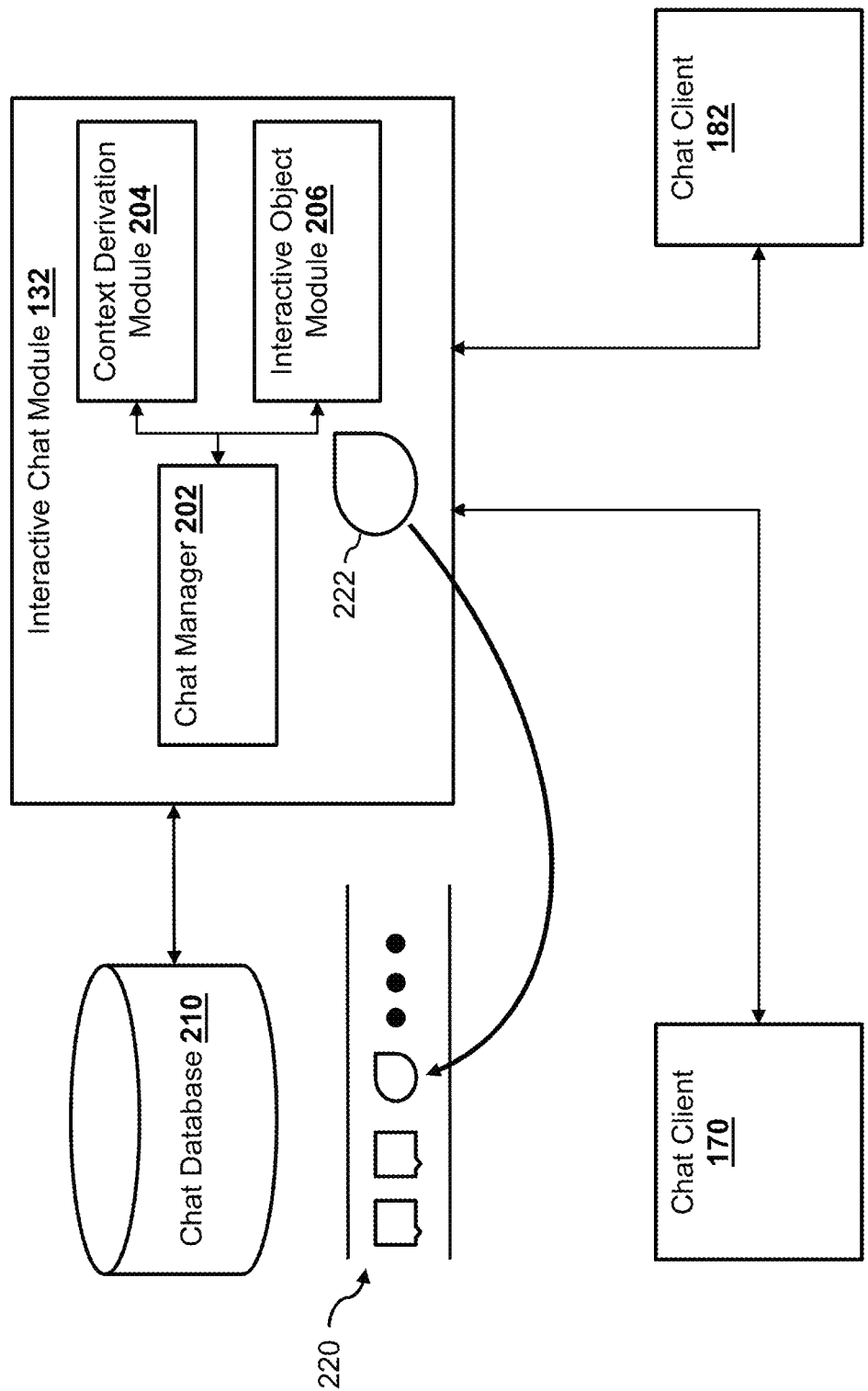
FIG. 2 is a block diagram illustrating an interactive chat module according to an embodiment of the present disclosure.

FIG. 2 illustrates a block diagram of the interactive chat module 132 according to an embodiment of the disclosure. The interactive chat module 132 includes a chat manager 202, a context derivation module 204, and an interactive object module 206. The chat manager 202 may detect or establish an online chat session between two chat clients (e.g., the chat clients 170 and 182) in response to a trigger (e.g., a user input on one of the chat clients 170 and 182, etc.). The chat manager 202 may monitor the messages being transmitted during the online chat session and use the context derivation module 204 to derive a context for the online chat session. The chat manager 202 may also use the interactive object module 206 to generate a chat object for the online chat session based on the derived context according to various embodiments of the disclosure. The chat manager 202 may record the messages transmitted during the online chat session as a chat flow and may store the chat flow in the chat database 210. The functionalities of the chat manager 202, the context derivation module 204, and the interactive object module 206 will be discussed in more detail below.

Figure 3:
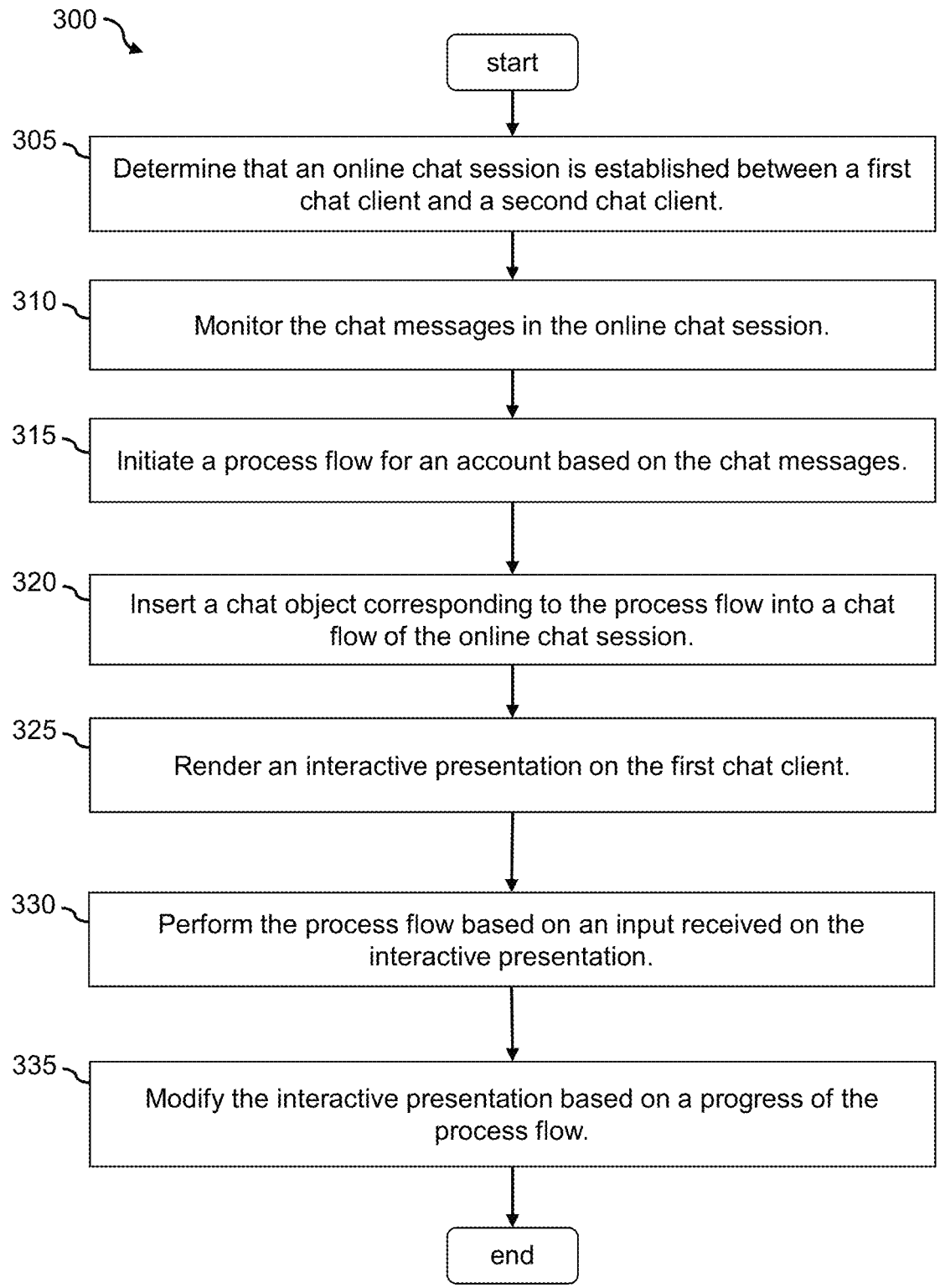
FIG. 3 is a flowchart showing a process of providing dynamic and interactive content in an online chat session according to an embodiment of the present disclosure.

FIG. 3 illustrates a process 300 for providing dynamic and interactive content in one or more online chat sessions according to various embodiments of the disclosure. In some embodiments, the process 300 may be performed by the interactive chat module 132. The process 300 begins by determining (at step 305) that an online chat session is established between a first chat client and a second chat client. For example, a user, such as the user 140 may use the chat interface of the chat client 170 or the UI application 112 executed on the user device 110 to request for an online chat session with the service provider. The user 140 may be associated with an account with the service provider and may have conducted one or more electronic transactions with the service provider server 130 using the account. The user 140 may initiate the online chat session with the service provider because the user has an issue (e.g., a dispute with one of the transactions, requesting a refund from a transaction, etc.) with one or more of the transactions or an issue with a service or a functionality of the website provided by the service provider (e.g., a question regarding a service offered by the service provider, etc.).

In some embodiments, the chat client 170 is associated with the service provider server 130. For example, the chat client 170 may use a chat protocol associated with the interactive chat module 132 (e.g., the chat client 170 is a proprietary chat client associated with the service provider). In another example, the chat client 170 may be embedded within a website of the service provider generated by the web server 134. As such, the interactive chat module 132 may receive the request to initiate the online session from the user device 110. In response to receiving the request, the interactive chat module 132 may designate a device (e.g., the device 180) for engaging in the online chat session (e.g., to be the other party in the online chat session) and establish the online chat session between the chat client 170 executed on the user device 110 and the chat client 182 executed on the device 180.

In some embodiments, the chat client 170 may be a third-party chat client (e.g., WhatsApp®, Facebook® Messenger, iMessages®, etc.), and the online chat session is established by a third-party chat server between the chat clients 170 and 182 through the service provider server 130. For example, the service provider server 130 may register a chat account with one or more of the third-party chat servers, and indicate to the third-party chat servers that any online chat session with the chat account (e.g., a request for an online chat session with the chat account) would be submitted to the interactive chat module 132 (e.g., an Internet Protocol (IP) address associated with the interactive chat module 132). As such, any request to initiate an online chat session with the chat account is received by the interactive chat module 132. In response to receiving the request, the interactive chat module 132 may designate a device (e.g., the device 180) for engaging in the online chat session (e.g., to be the other party in the online chat session). Alternatively, the interactive chat module 182 may be communicatively coupled with the chat client 182 and may monitor activities of the chat client 182. As such, the interactive chat module 132 may determine that the online chat session has been established between the chat clients 170 and 182 from the activities of the chat client 182.

In response to determining that the online chat session is established, the interactive chat module 132 may determine a chat environment of the chat client 170. For example, the interactive chat module 132 may determine the chat environment of the chat client 170 based at least in part on the request received from the chat client 170. The interactive chat module 132 may analyze the metadata of the request, the protocol used in the request, and/or the format of the request to determine a chat client type. The chat environment may indicate whether the chat client 170 is a proprietary chat client associated with the service provider server 130 or a third-party chat client associated with an external chat server. The chat environment may also indicate whether the chat client 170 supports dynamic content or only static content. The determined chat environment may be used by the interactive chat module 132 for formatting a chat presentation based on a chat object.

Figure 4:
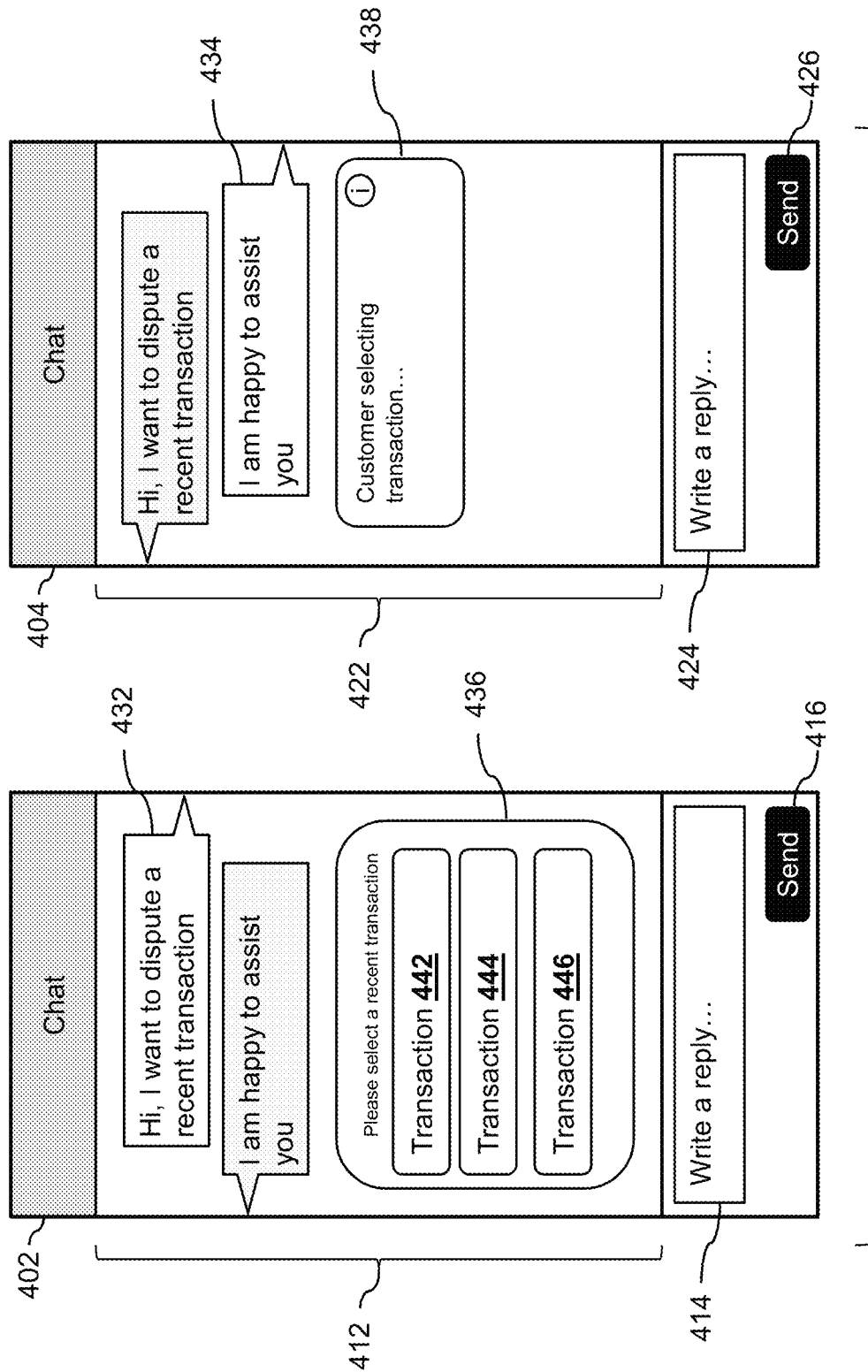
FIG. 4 illustrates an interactive presentation during an online chat session according to an embodiment of the present disclosure.

At step (310), the process 300 monitors the chat messages in the online chat session. For example, the interactive chat module 132 may monitor chat messages that are exchanged between the chat clients 170 and 182 within the online chat session and use the context derivation module 204 to derive a chat context for the online chat session. FIG. 4 illustrates chat interfaces 402 and 404 provided by the chat clients 170 and 182, respectively. As shown in FIG. 4, the chat interface 402 includes a chat presentation portion 412 for displaying messages and/or content from a chat flow associated with the online chat session. The chat flow may include messages exchanged between the chat clients 170 and 182, and messages and/or content generated by the interactive chat module 132 and inserted into the chat flow. The chat interface 402 also includes an input portion 414 that enable the user 140 to input a message (e.g., text data, audio data, multi-media data, etc.) for transmitting to the chat client 182 and a 'send' button 416 for submitting a message typed in the input portion 414. Similarly, the chat interface 404 includes a chat presentation portion 422 for displaying messages and/or content from a chat flow associated with the online chat session, an input portion 424 that enable the entity 190 to input a message (e.g., text data, audio data, multi-media data, etc.) for transmitting to the chat client 170, and a 'send' button 426 for submitting a message typed in the input portion 424.

In this example, the user 140 may transmit a message 432 "Hi, I want to dispute a recent transaction" by typing the message 423 in the input portion 414 and selecting the 'send' button 416. In one example where the chat client 170 uses the chat protocol associated with the interactive chat module 132, when the user 140 selects the 'send' button 416, the message 423 is first transmitted by the chat client 170 to the interactive chat module 132. The interactive chat module 132 may analyze the message 423, insert the message 423 into the chat flow (e.g., the chat flow 220 in FIG. 2) associated with the established online chat session, and transmit the message 423 as part of the chat flow 220 to the chat client 182. Upon receiving the message 423 (or the chat flow associated with the online chat session), the chat client 182 presents the message 423 on the chat presentation portion 422 of the chat interface 404. After reviewing the message 423 via the chat client 182, the entity 190 may submit a message 434 "I am happy to assist you" by typing the message in the input portion 424 and selecting the 'send' button 426.

As the entity 190 selects the 'send' button 426, the chat client 182 may transmit the message 434 to the interactive chat module 132. The interactive chat module 132 may analyze the message 434, insert the message 434 into the chat flow 220 associated with the online chat session, and transmit the message 434 (or the chat flow) to the chat client 170 of the user device 110. As such, the interactive chat module 132 may monitor the messages exchanged between the chat clients 170 and 182 by obtaining the messages received from the chat clients 170 and 182. In the example where the chat client 170 uses a third-party protocol, the interactive chat module 132 may monitor (e.g., record) the messages received by the chat client 182 and messages transmitted from the chat client 182.

As discussed above, the interactive chat module 132 may use the context derivation module 204 to derive a chat context from the one or more messages exchanged within the online chat session. In some embodiments, the context derivation module 204 may include a natural language processor that parses the text in the messages and derive a context (e.g., a meaning) from the messages. For example, the context derivation module 204 may parse the messages 432 and 434 to derive a context that the user 140 wants to dispute a recent transaction. However, no particular transaction was indicated from the messages 432 and 434.

The process 300 then initiates (at step 315) a process flow (e.g., a workflow) for an account based on the chat messages. In some embodiments, multiple workflows for assisting the user 140 may be selected and initiated by the interactive chat module 132. For example, the workflows may include a transaction dispute workflow, a refund workflow, a one-time password challenge workflow, a knowledge inquiry workflow, and possibly other workflows. Based on the derived context, the interactive chat module 132 may select and initiate the transaction dispute workflow for the user 140. The interactive chat module 132 may obtain an account identifier of an account that is associated with the user 140. For example, the interactive chat module 132 may store an identifier (e.g., an account identifier, a cookie, etc.) on the user device 110, and the identifier may be transmitted to the interactive chat module 132 when the user 140 initiates the online chat session. As such, the interactive chat module 132 may initiate the transaction dispute workflow for the account associated with the user 140.

Figure 5:
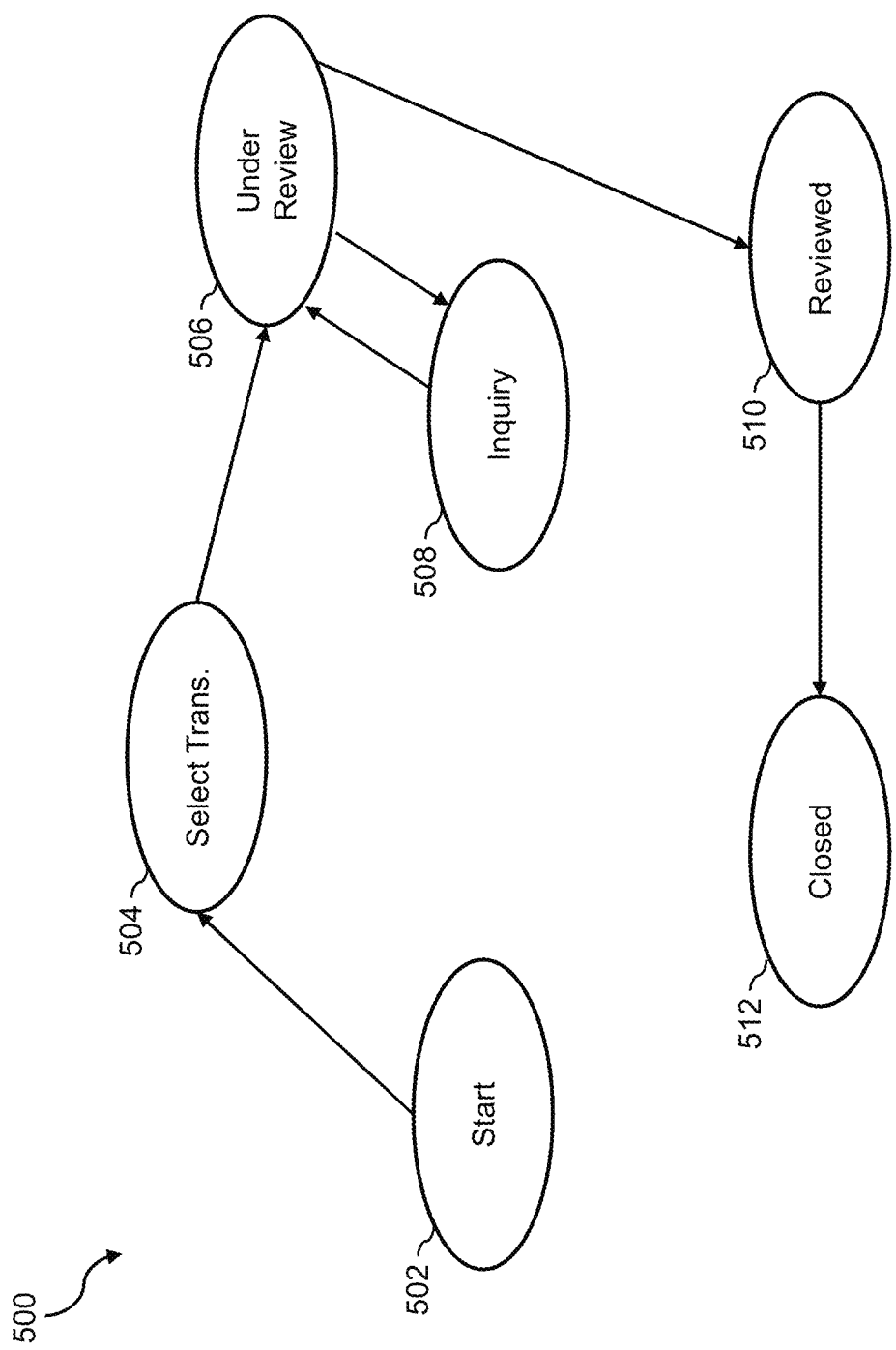
FIG. 5 is a state diagram illustrating the different states of an example workflow according to an embodiment of the present disclosure.

In some embodiments, each of the workflows may include multiple states representing a progress of the workflow. Each of the workflows may also be associated with a process that implements the workflows. The process may manage and perform actions associated with the workflow based on a current state. For example, each workflow may include at least a 'start' state and an 'end' state. Some of the workflows may include additional states that represent different progression statuses of the workflow. Each of the states may represent a status and also one or more actions to move to another state. FIG. 5 illustrates an example state machine 500 that includes states associated with the transaction dispute workflow. The state machine 500 includes a 'start' state 502. When a transaction dispute process (e.g., software instructions that implement the transaction dispute workflow) is executed (e.g., based on the initiation of a transaction dispute workflow by the interactive chat module 132), the transaction dispute process may begin at the 'start' state 502. The transaction dispute process may move to the 'transaction selection' state 504 automatically to select a particular transaction for the dispute. During the 'transaction selection' state 504, the transaction dispute process may request for or wait for an input that indicates a particular transaction for performing the transaction dispute. Once a particular transaction is identified (e.g., received from the interactive chat module 132), the transaction dispute process may move to the 'under review' state 506 for processing the transaction dispute. While the transaction dispute is being processed, if additional information is required (e.g., from the user who initiated the dispute, a merchant, etc.), the transaction dispute process may move to the 'inquiry' state 508. The transaction dispute process may remain in the 'inquiry' state 508 while awaiting the additional information. When the transaction dispute process obtains the information, the transaction dispute process may move back to the 'under review' state 506. During the 'under review' state 506, the transaction dispute process may analyze information of the selected transaction and the additional information obtained from the user and/or from the merchant.

When the review is complete (e.g., the transaction dispute process has determined an outcome of the transaction dispute), the transaction dispute process may move to the 'reviewed' state 510. The 'reviewed' state 510 may also be associated with the determined outcome (e.g., an approval or deny). The transaction dispute process may then move to the 'closed' (or the 'end') state 512 when the transaction dispute is resolved between the user and the merchant. Thus, in this example, when the interactive chat module 132 initiates the transaction dispute workflow and executes the transaction dispute process, the transaction dispute process is associated initially with the 'start' state 502.

Since no transaction was identified for the dispute from the messages exchanged in the online chat session, the transaction dispute process may automatically move to the 'transaction selection' state 504. In this 'transaction selection' state, the entity 190 may ask the user 140 to indicate a particular transaction for the dispute and provide the indicated transaction to the transaction dispute process. However, as discussed above, in order for the user 140 to communicate the transaction for the dispute, the user 140 may have to retrieve information (e.g., a transaction identifier) associated with the transaction, which may not always be readily available. In an example, the user 140 may have to execute another application (e.g., a web browser) or another browser window, log in to the account of the user 140, retrieve information of recent transactions, identify the transaction for the dispute, type in the transaction identifier of the transaction on to the chat interface 402, and submit the message that includes the transaction identifier. This manual process is burdensome and error-prone. As such, according to some embodiments of the disclosure, the interactive chat module 132 may automatically retrieve (e.g., without requiring any action by the user 140 or the entity 190) one or more recent transactions associated with the identified account from the account database 136. In some embodiments, the interactive chat module 132 may retrieve the transaction(s) based on a limit, such as a number limit (e.g., retrieving the most recent predetermined number of transactions associated with the account), a time limit (e.g., retrieving the transactions that occurred within a predetermined time range), a word or words describing the item (e.g., "toy" or "phone case" that retrieves purchases of that type, which can be within a predetermined time period or within a predetermined return period), and/or other words that enable potential transactions to be identified (e.g., time range the purchase was made, city or state where the purchase was made, and/or a price range for the purchase). The interactive chat module 132 may then present the retrieved transactions to the user 140 via the chat interface 402 to enable the user 140 to select a particular transaction for the dispute.

In some embodiments, the interactive chat module 132 may generate a chat object for the online chat session to present dynamic and interactive content to the user 140 and/or the entity 190. Referring back to FIG. 3, the process 300 inserts (at step 320) a chat object corresponding to the process flow into a chat flow of the online chat session. For example, the interactive object module 206 may generate a chat object 222 for the online chat session. The chat object 222 may include a data structure for storing information that can be used for generating dynamic and interactive content for the user 140 and/or the entity 190. In this example, the interactive object module 206 may store information related to the workflow and the process initiated for the user account (e.g., the transaction dispute workflow/the transaction dispute process), a current state of the transaction dispute workflow (e.g., the 'transaction selection' state), the account identifier associated with the account of the user 140, and the chat environment of the chat client 170 in the data structure of the chat object 222. In addition, after retrieving the identified transactions associated with the user 140, the interactive object module 206 may also store information related to the retrieved transactions in the chat object 222. In some embodiments, in addition to the data structure, the interactive object module 206 may generate the chat object 222 to include software instructions for dynamically generating presentation content for the chat clients (e.g., the chat clients 170 and 182) based on the data stored in the object 222. The interactive object module 206 may then insert the chat object 222 into the chat flow 220 associated with the online chat session.

Messages and/or content that is pushed (e.g., added) to the chat flow 220 is transmitted to the chat clients 170 and 182 associated with the chat flow 220. For static messages (e.g., the messages 432 and 434) included in the chat flow 220, the same content included in the messages is transmitted to the chat clients 170 and 182, such that the chat clients 170 and 182 would present identical static content from the messages (e.g., the message 432 and 434) based on the chat flow 220. However, when the chat flow 220 includes the chat object 222, the chat object may generate and/or render dynamic and interactive content for the chat clients 170 and 182. For example, the chat object 222 may generate different presentations for different chat clients 170 and 182. Furthermore, the chat object 222 may modify the presentations for the chat clients 170 and 182 based on an event (e.g., a change of status of the workflow, etc.).

As such, the process 300 renders (at step 325) an interactive presentation on the first chat client. For example, based on the current state (e.g., the 'transaction selection' state) of the transaction dispute workflow, the chat object 222 may generate, for rendering by the chat client 170, an interactive presentation that includes a list of the transactions retrieved by the chat manager 202, for the user 140 to select. In some embodiments, the chat object 222 may generate the interactive presentation in a format based on the chat environment of the chat client 170. For example, when it is determined that the chat client 170 supports rich content, the chat object 222 may generate the interactive presentation in a format that includes encoded interactive elements (e.g., selective elements encoded with HTML elements, JavaScript code, etc.). When it is determined that the chat client 172 only supports static content, the chat object 222 may generate the presentation in a format that includes static content.

In this example, since the chat client 170 is a chat client associated with the service provider server 130 and that supports rich content, the chat object 222 generates the interactive presentation 436 to be rendered by the chat client 170. The chat manager 202 then transmits the presentation 436 to the chat client 170 of the user device 110. The chat client 170 then renders the presentation 436 on the chat interface 402. As shown, the presentation 436 includes a list of transactions associated with the user 140, including the transactions 442, 444, and 446. The presentation also includes instructions for the user 140 to select one of the listed transactions. In some embodiments, the presentation 436 is rendered such that each one of the listed transactions 442-446 is a selectable element that enables to select any one of the transactions 442-446 by interacting with the interactive presentation 436. For example, when the user device 110 includes a touch-sensitive display for displaying the chat interface 402, the user 140 may select one of the transactions 442-446 by touching the display area that corresponds to the rendered transaction. This way, the user may accurately provide an indication of the transaction for the dispute without leaving the chat interface 402. Note that the list need not include multiple transactions and may include just a single identified transaction, in which case, the user 140 may be asked to confirm the displayed transaction as the transaction the user is interested in.

The chat manager 202 may also assign an expiration time to the interactive presentation 436, such that the interactive presentation 436 may become static (e.g., by disabling the interactive elements in the interactive presentation 436) after the expiration time. For example, because the transactions 442, 444, 446 may not be available for dispute after a certain period of time (e.g., a predetermined time after the transaction is performed), by disabling one or more of the interactive elements in the interactive presentation 436, the chat manager 202 prevents the user from selecting a transaction that is no longer available for dispute.

As discussed above, the chat object 222 may generate different presentations to different chat clients 170 and 182. In this example, while the chat object 222 generates the presentation 436 for the chat client 170, the chat object 222 may generate a different presentation (e.g., the presentation 438) for the chat client 182. Since it is unnecessary for the entity 190 to view the transaction candidates (e.g., the transactions 442-446), the chat object 222 may generate the presentation 438 that indicates to the entity 190 that the user 140 is currently selecting a transaction.

Rendering different presentations to different chat clients in online chat sessions provide numerous advantages. For example, the entity 190 may be a human employee of the service provider as many users prefer to chat with a human instead of a robot. However, the user 140 may not want the human employee to have access to some sensitive information (e.g., security data, financial data, etc.) associated with the user 140. As such, by rendering different presentations to different chat clients, the chat object 222 may still obtain and/or present sensitive information to the user 140 through the online chat session without divulging the sensitive information to the human entity 190. For example, before retrieving the transactions associated with the account for the user 140, the interactive chat module 132 may require the user 140 to provide user credentials associated with the account to authenticate the user 140. As such, the chat object 222 may render an interactive presentation that includes an input area for the user to enter the user credentials (e.g., a password). Since the presentations for the chat clients 170 and 182 are asynchronous (e.g., the presentations are not identical), the credentials input by the user 140 through the interactive presentation (e.g., the presentation 436) is not rendered on the interface 404, and thus is not viewable by the entity 190, which enhances the security of the sensitive information of the user. Furthermore, without rendering the list of transactions to the chat client 182, the entity 190 is not overwhelmed with information being displayed on the chat interface 404 that is not needed by the entity 190.

Referring back to FIG. 3, at step 330, the process 300 performs the process flow based on an input received on the interactive presentation. For example, upon receiving a selection of a particular transaction (e.g., the transaction 444) from the user 140 via the interactive presentation 436, the chat object 222 may provide information (e.g., the identifier) of the transaction 444 to the transaction dispute process to process a dispute for the transaction 444. As a transaction has been selected, the transaction dispute process may move from the 'transaction selection' state 504 to the 'under review' state 506. As such, the chat object 222 may update the status stored internally in the data structure of the object 222 to the 'under review' state as well.

Figure 6:
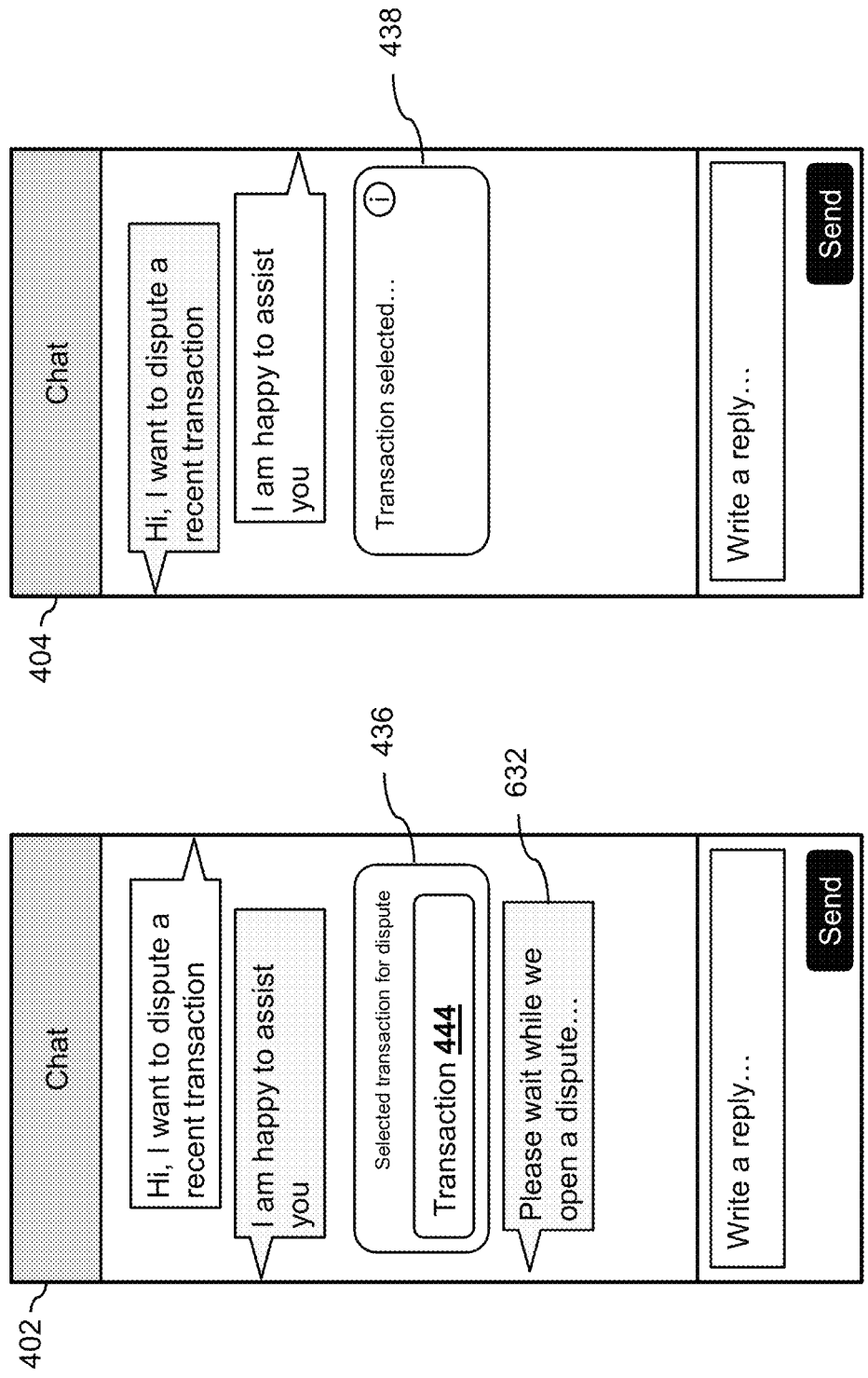
FIG. 6 illustrates a modification to an interactive presentation rendered on a chat interface during an online chat session according to an embodiment of the present disclosure.

The process 300 then modifies (at step 335) the interactive presentation based on a progress of the process flow. In some embodiments, in response to receiving the selection of the transaction 444 via the interactive presentation 436, the chat object 222 may modify the interactive presentation 436 to remove the unselected transactions (e.g., the transactions 442 and 446). The chat object 222 may transmit the modified interactive presentation 436 to the chat client 170 of the user device 110 to be rendered on the chat interface 402. As shown in FIG. 6, the chat client 402 has rendered the interactive presentation 436 that has been modified by the chat object 222. The modified interactive presentation 436 includes an indication that the transaction 444 has been selected for the dispute. In addition to modifying the interactive presentation 436, the chat object 222 may also modify the presentation 438 that is rendered on the interface 404 of the chat client 182. Similarly, the chat object 222 may transmit the modified presentation 438 to the chat client 182 of the device 180 to be rendered on the chat interface 404. As shown in FIG. 6, the presentation 438 is shown to be modified by the chat object 222 to indicate to the entity 190 that a transaction has been selected by the user 140.

In some embodiments, the chat object 222 may also transmit an additional message (e.g., a message 632) notifying the user 140 that a dispute is being opened for the transaction 444. Due to the asynchronous feature of the interactive chat module 132, the chat object 222 may configure the interactive chat module 132 to transmit the message 632 only to the chat client 170, while not transmitting the same message 632 to the chat client 182 such that the message 632 is only presented to the user 140 via the chat interface 402.

Figure 7:
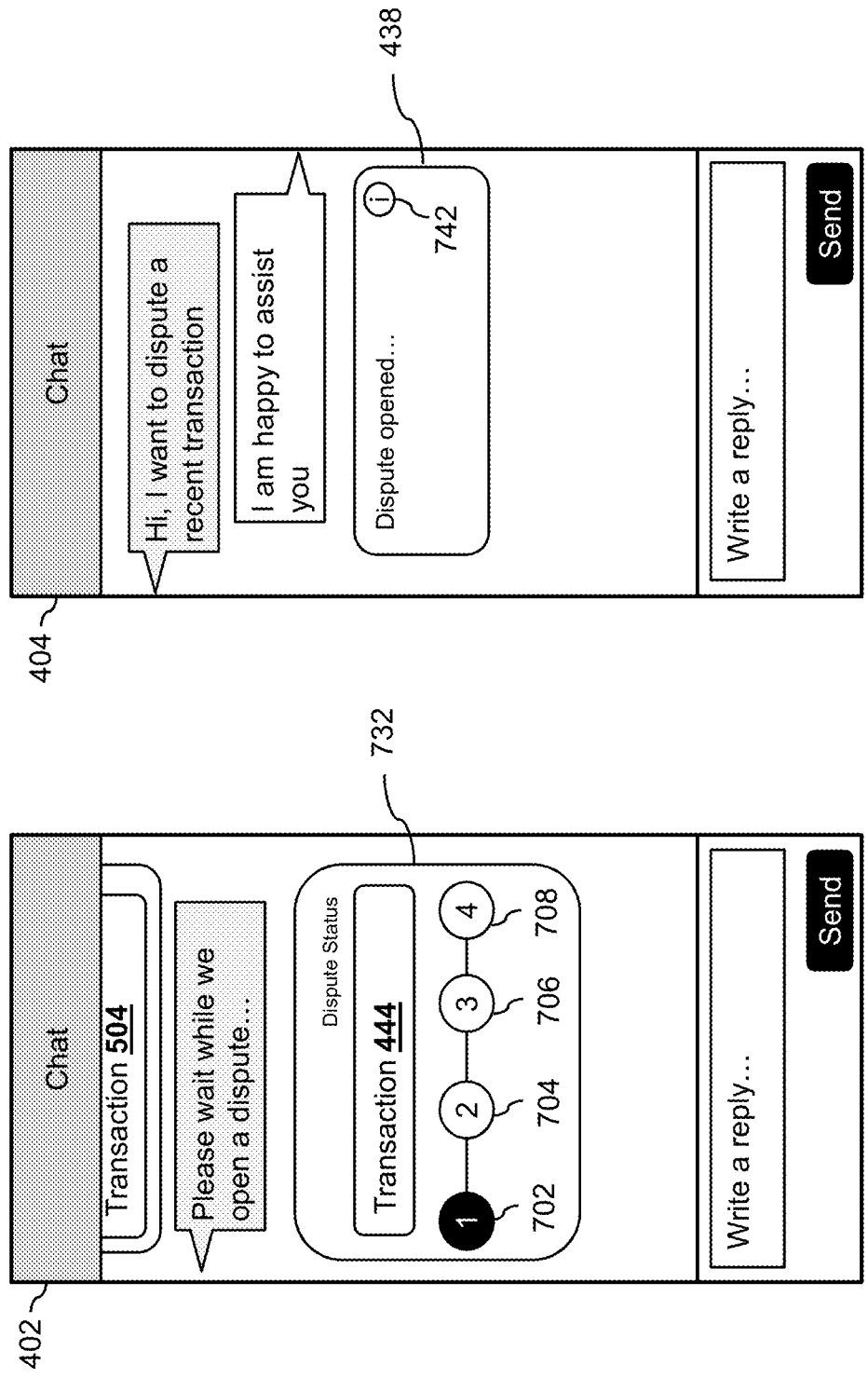
FIG. 7 illustrates another interactive presentation rendered on a chat interface during an online chat session according to an embodiment of the present disclosure.

In addition to showing the user 140 the selected transaction for the dispute, the chat object 222 may also provide a current status of the dispute, either by modifying the interactive presentation 436 or through a new interactive presentation. For example, FIG. 7 illustrates an interactive presentation 732 generated by the chat object 222 and rendered on the chat interface 402. As shown, the interactive presentation 732 indicates the transaction (e.g., the transaction 444) that is currently in dispute. The interactive presentation 732 also includes indicators 702, 704, 706, and 708. Each of the indicators 702, 704, 706, and 708 represents a different status of the transaction dispute process. For example, the indicator 702 represents the 'start' or the 'open' state, the indicator 704 represents the 'under review' state, the indicator 706 represents the 'reviewed' state, and the indicator 708 represents the 'closed' state. Since the dispute has been opened, the chat object 222 may generate the interactive presentation 732 to highlight the indicator 702 corresponding to the 'opened' state. Once the current status in the chat object 222 has been updated to the 'under review' state 506, the chat object 222 may modify the interactive presentation 732 to highlight the indicator 704 instead of the indicator 702. In some embodiments, the interactive object module 206 and/or the chat object 222 may continue to monitor the status of the transaction dispute process. When the status of the process changes, the interactive object module 206 and/or the chat object 222 may update the status stored in the chat object 222. In some embodiments, updating the status within the chat object 222 automatically triggers a set of actions. For example, upon receiving an update to the status (e.g., from the 'under review' state 506 to the 'reviewed' state 510), the chat object 222 may modify the interactive presentation 732 to highlight the corresponding indicator. In some embodiments, each of the indicators is a selectable element. When a selection of an indicator is received via the interactive presentation 732, the chat object 222 may retrieve additional information related to the transaction dispute and present in the interactive presentation 732.

Furthermore, when it is determined that additional information is required from the user 140 for the dispute (e.g., the chat object 222 receives a notification from the transaction dispute process), the chat object 222 may further modify the interactive presentation 732 to ask the user 140 for the additional information and may provide an input area in the interactive presentation 732 for the user to input the additional information. Upon receiving the additional information via the interactive presentation 732, the chat object 222 may pass the additional information to the transaction dispute process.

In addition to providing the interactive presentation 732 to the chat client 170, the chat object may also modify the presentation 438 for the chat client 182. For example, the chat object 222 may modify the presentation 438 to indicate the current state of the dispute. As shown in FIG. 7, the presentation 438 indicates that the dispute has been opened. In some embodiments, the chat object 222 may include an interactive element 742 (e.g., an information inquiry element) in the presentation 438. The interactive element 742 is selectable by the entity 190, and upon selected, may present additional information related to the dispute (e.g., details of the selected transaction, actions performed during the dispute, etc.) in the presentation 438.

Since the transaction dispute process may not be completed immediately (it may take several hours or several days), the online chat session may be terminated before the dispute transaction is completed (e.g., the user 140 closing the chat interface 402 and/or the chat client 170, the chat manager 202 terminating the online chat session after a predetermined time of inactivity has passed, etc.). In some embodiments, the interactive chat module 132 may provide persistent state of a process flow across multiple online chat sessions. For example, the interactive chat module 132 may store (e.g., during the online chat session or in response to terminating the online chat session) the chat flow (e.g., the chat flow 220) including the chat object 222 in the chat database 210. As such, the chat flow 220 may be accessed by the interactive chat module 132 even after the online chat session is terminated.

In some embodiments, the interactive chat module 132 may access the chat flow 220 when a subsequent online chat session is established with the chat client 170 (e.g., when the user 140 initiates another chat session with the service provider server 130 using the chat client 170). For example, when the interactive chat module 132 receives a request to establish a chat session with the chat client 170, the interactive chat module 132 may identify the chat flow 220 based on an identifier of the chat client 170 that can be obtained from the request, and may retrieve the chat flow 220. According to various embodiments of the disclosure, when the chat flow 220 is retrieved, the interactive chat module 132 may determine whether a chat object is included in the chat flow 220. When it is determined that the chat flow 220 includes a chat object (e.g., the chat object 222), the interactive object module 206 and/or the chat object 222 may perform an update routine to update the chat object 222. For example, the interactive object module 206 and/or the chat object 222 may determine that the chat object 222 is associated with a transaction dispute process for the transaction 444 initiated by the user 140, based on the data stored in the chat object 222. The interactive object module 206 and/or the chat object 222 may automatically inquire an updated status from the transaction dispute process and update the status stored in the chat object 222. For example, the transaction dispute process has moved to the 'reviewed' state with an approved status. As such, the interactive object module 206 and/or the chat object 222 may update the state stored in the chat object 222 to the 'reviewed' state and store the approved status in the chat object 222.

In some embodiments, the chat object 222 may then generate an interactive presentation for display on the chat interface 402 of the chat client 170 based on the updated status. For example, the chat object 222 may generate an interactive presentation that is similar to the interactive presentation 732, except that the indicator 706 corresponding to the 'reviewed' state is highlighted. In addition, the chat object 222 may indicate in the interactive presentation that the transaction dispute has been approved. The chat object 222 may then transmit such interactive presentation to the chat client 170 for rendering, and the chat client 170 may render the interactive presentation on the chat interface 402.

Similarly, the chat object 222 may also generate another interactive presentation to be rendered on the chat interface 404 of the chat client 182. The interactive presentation for the chat client 182 may be similar to the presentation 438, except that a notification that the transaction dispute is in the 'reviewed' state with an approval status is presented in the presentation. The chat object 222 may transmit the presentation to the chat client 182, and the chat client 182 may render such presentation on the chat interface 404. This way, even though the user 140 has just initiated a new online chat session with the entity 190 without providing any context, the persistent data stored in the chat object 222 enables the chat object 222 to provide contextual relevant and up-to-date information the transaction dispute to both the user 140 and the entity 190 to facilitate the conversation by presenting the dynamic and interactive presentation in the respective chat interfaces 402 and 404.

In addition to providing dynamic presentation and interacting with the user 140, the chat object 222 in some embodiments may also monitor the manner in which the user 140 interacts with the interactive presentation rendered on the chat interface 402, and present information derived from such monitoring to the entity 190. For example, in an online chat session, the user 140 may inquire about a functionality of a service offered by the service provider server 130. The interactive chat module 132 may initiate an inquiry process and generate a chat object for the inquiry process. The chat object may retrieve articles (e.g., a webpage) related to the inquiry, and present an article in an interactive presentation on the chat interface 402. The chat object may monitor interactions of the user 140 with the interactive presentation, such as a duration in which the user 140 has the chat interface 402 active (indicating how long the user 140 has been reading the article), a scroll rate, whether the user 140 uses a cursor to highlight one or more sections of the article, etc. The information derived from monitoring the interactions may be presented to the entity 190 on the chat interface 404 in a presentation, such that the entity 190 may know the progress of the user reading the article and anticipate whether the user has any questions regarding the article.

Thus, the interactive chat module 132 of some embodiments enhances an online chat experience by providing dynamic and interactive content in the form of an interactive presentation embedded in the chat interface to one or more of the users participating in an online chat session. The interactive chat module 132 may dynamically modify the content within the interactive presentation rendered on the chat client(s) based on one or more triggering events, such as an update to the status of a workflow. The user may view updated information and/or interact (e.g., providing information, etc.) with the interactive presentation. For example, when the interactive presentation includes selectable elements and/or one or more input fields, the user may provide additional information (e.g., selection of a transaction, user credential data, etc.) to the interactive chat module 132. The asynchronous feature of the interactive chat module 132 enables different content to be presented on different chat clients engaged in the online chat session, such that information (e.g., the user credential data, etc.) provided by one party may be not viewed by another party in the online chat session. Interactions of a user with the interactive presentation may also be monitored, and information derived from the monitoring may be provided to the other user of the online chat session to further facilitate the conversation within the online chat session.

Figure 8:
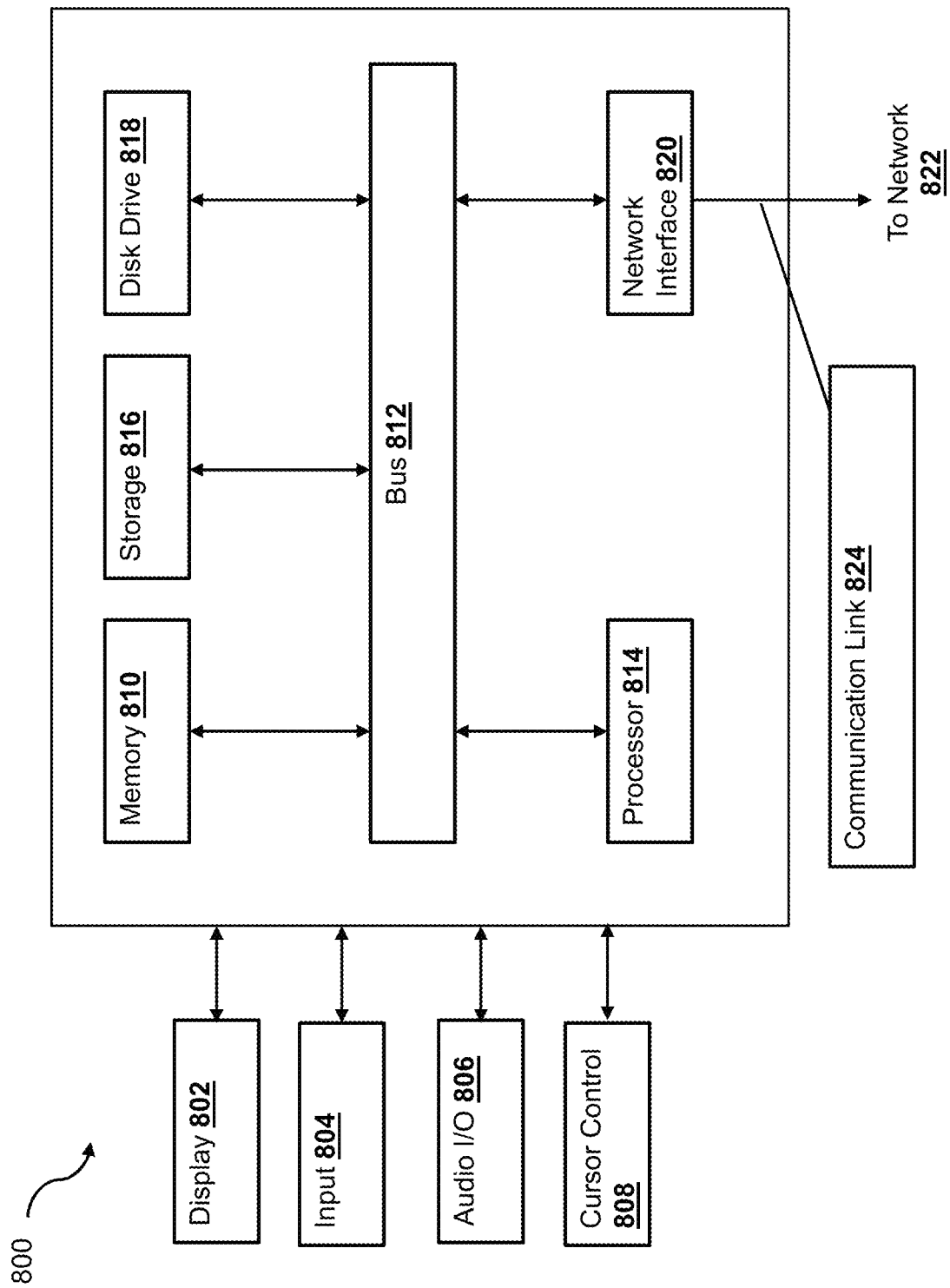
FIG. 8 is a block diagram of a system for implementing a device according to an embodiment of the present disclosure.

FIG. 8 is a block diagram of a computer system 800 suitable for implementing one or more embodiments of the present disclosure, including the service provider server 130, the user device 110, and the device 180. In various implementations, the user device 110 and/or the device 180 may include a mobile cellular phone, personal computer (PC), laptop, wearable computing device, etc. adapted for wireless communication, and the service provider server 130 may include a network computing device, such as a server. Thus, it should be appreciated that the devices 110, 180, and 130 may be implemented as the computer system 800 in a manner as follows.

The computer system 800 includes a bus 812 or other communication mechanism for communicating information data, signals, and information between various components of the computer system 800. The components include an input/output (I/O) component 804 that processes a user (i.e., sender, recipient, service provider) action, such as selecting keys from a keypad/keyboard, selecting one or more buttons or links, etc., and sends a corresponding signal to the bus 812. The I/O component 804 may also include an output component, such as a display 802 and a cursor control 808 (such as a keyboard, keypad, mouse, etc.). The display 802 may be configured to present a login page for logging into a user account, a checkout page for purchasing an item from a merchant, or a chat interface for facilitating an online chat session. An optional audio input/output component 806 may also be included to allow a user to use voice for inputting information by converting audio signals. The audio I/O component 806 may allow the user to hear audio. A transceiver or network interface 820 transmits and receives signals between the computer system 800 and other devices, such as another user device, a merchant server, or a service provider server via network 822. In one embodiment, the transmission is wireless, although other transmission mediums and methods may also be suitable. A processor 814, which can be a micro-controller, digital signal processor (DSP), or other processing component, processes these various signals, such as for display on the computer system 800 or transmission to other devices via a communication link 824. The processor 814 may also control transmission of information, such as cookies or IP addresses, to other devices.

The components of the computer system 800 also include a system memory component 810 (e.g., RAM), a static storage component 816 (e.g., ROM), and/or a disk drive 818 (e.g., a solid state drive, a hard drive). The computer system 800 performs specific operations by the processor 814 and other components by executing one or more sequences of instructions contained in the system memory component 810. For example, the processor 814 can perform the interactive online chatting functionalities described herein according to the process 300.

Logic may be encoded in a computer readable medium, which may refer to any medium that participates in providing instructions to the processor 814 for execution. Such a medium may take many forms, including but not limited to, non-volatile media, volatile media, and transmission media. In various implementations, non-volatile media includes optical or magnetic disks, volatile media includes dynamic memory, such as the system memory component 810, and transmission media includes coaxial cables, copper wire, and fiber optics, including wires that comprise the bus 812. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 800. In various other embodiments of the present disclosure, a plurality of computer systems 800 coupled by the communication link 824 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
a non-transitory memory; and
one or more hardware processors coupled with the non-transitory memory and configured to read instructions from the non-transitory memory to cause the system to perform operations comprising:
determining that a first online chat session has been established between a first chat client operated by a first device and a second chat client operated by a second device;
identifying, from a plurality of accounts, a first account associated with the first chat client;
initiating a first process flow for the first account based on one or more chat messages transmitted in the first online chat session wherein the initiating the first process flow comprises assigning a first state to a state attribute of the first process flow;
configuring a first chat object for the first account based on the first process flow and the first state, wherein the configuring the first chat object comprises storing data associated with the first account and the first process flow in a data structure of the first chat object, and wherein the first chat object includes programming instructions configured to perform actions within the first online chat session based on the data stored in the data structure of the first chat object;
inserting the first chat object into a first chat flow of the first online chat session, wherein the first chat object is configured to perform the actions within the first online chat session based on the data stored in the data structure, the actions comprising rendering a first interactive presentation on the first chat client as part of the first online chat session based on the first state of the first process flow, and rendering a second interactive presentation on the second chat client as part of the first online chat session based on the first state of the first process flow, wherein the first interactive presentation is different from the second interactive presentation, wherein the first chat object is further configured to prompt a user of the first chat client for one or more inputs corresponding to the first process flow via the first interactive presentation based on the first state of the first process flow, to receive the one or more inputs via the first interactive presentation, to mask at least a portion of the one or more inputs, and to present a masked version of the one or more inputs on the second chat client via the second interactive presentation;
while the masked version of the data is presented on the second chat client via the second interactive presentation, performing a first process associated with the first process flow based on the one or more inputs received via the first interactive presentation from the first chat client and updating the state attribute of the first process flow from the first state to a second state based on the performing the first process, wherein the performing the first process comprises retrieving one or more transaction records associated with the first account based on the at least the portion of the one or more inputs;

presenting, on the second chat client via the second interactive presentation, the one or more transaction records associated with the first account; and in response to determining that the first online chat session is terminated, storing the updated state attribute of the first process flow as updated data in the data structure of the first chat object.

2. The system of claim 1, wherein the assigning the first state includes selecting one of a plurality of states associated with the first process flow.

3. The system of claim 1, wherein the operations further comprise:

determining that a second online chat session has been established with the first chat client; and inserting the first chat object into a second chat flow of the second online chat session, wherein the first chat object is configured to render, based on the updated data stored in the data structure of the first chat object, a third interactive presentation on the first chat client as part of the second online chat session.

4. The system of claim 3, wherein the third interactive presentation includes a status indicator for presenting the updated state attribute of the first process flow.

5. The system of claim 1, wherein the second interactive presentation includes a link that enables the second chat client to retrieve additional information associated with the first account.

6. The system of claim 1, wherein the operations further comprise:

deriving a context of the first online chat session based on the one or more chat messages; and selecting, from a plurality of process flows, the first process flow based on the context derived from the one or more chat messages.

7. The system of claim 1, wherein the first chat object is further configured to modify the first interactive presentation based on the updated state of the first process flow.

8. A method comprising:

determining that a first online chat session has been established between a first chat client operated by a first device and a second chat client operated by a second device;

initiating, by one or more hardware processors, a first process flow for a first account associated with the first chat client based on one or more chat messages transmitted in the first online chat session, wherein the initiating the first process flow comprises assigning a first state to a state attribute of the first process flow;

configuring, by the one or more hardware processors, a chat object for the first account based on the first process flow and the first state, wherein the chat object stores data associated with the first account and the first process flow in a data structure of the chat object, and includes programming instructions configured to perform actions within the first online chat session based on the data stored in the data structure of the chat object;

inserting, by the one or more hardware processors, the chat object into a first chat flow of the first online chat session, wherein the chat object is configured to perform the actions within the first online chat session based on the data stored in the data structure, the actions comprising prompting a user of the first chat client for an input via a first interactive presentation rendered on the first chat client as part of the first online chat session based on the first state of the first process flow, receiving the input from the user via the first interactive presentation, masking a portion of the input, and presenting the masked input via a second interactive presentation rendered on the second chat client as part of the first online chat session based on the first state of the first process flow;

while the masked input is presented on the second chat client via the second interactive presentation, performing a first process associated with the first process flow based on the input received via the first interactive presentation and updating the state attribute of the first process flow from the first state to a second state based on the performing the first process, wherein the performing the first process comprises retrieving one or more records associated with the first account based at least in part on the portion of the input;

presenting, on the second chat client via the second interactive presentation, the one or more records associated with the first account;

determining that the first online chat session is terminated; and storing, by the one or more hardware processors, the updated state attribute of the first process flow as updated data in the data structure of the chat object.

9. The method of claim 8, wherein the assigning the first state includes selecting one of a plurality of states associated with the first process flow.

10. The method of claim 8, further comprising:

determining that a second online chat session has been established with the first chat client; and inserting the chat object into a second chat flow of the second online chat session, wherein the chat object is further configured to render a third interactive presentation on the first chat client as part of the second online chat session based on the updated data stored in the data structure of the chat object.

11. The method of claim 10, wherein the third interactive presentation includes a status indicator for presenting the updated state attribute of the first process flow.

12. The method of claim 8, wherein the second interactive presentation includes a link that enables the second chat client to retrieve additional information associated with the first account.

13. The method of claim 8, further comprising:

deriving a context of the first online chat session based on the one or more chat messages; and selecting, from a plurality of process flows, the first process flow based on the context derived from the one or more chat messages.

14. The method of claim 8, wherein the chat object is further configured to modify the first interactive presentation based on the updated data stored in the data structure of the chat object.

15. A non-transitory machine-readable medium having stored thereon machine-readable instructions executable to cause a machine to perform operations comprising:

determining that a first online chat session has been established between a first chat client operated by a first device and a second chat client operated by a second device;

initiating a first process flow for a first account associated with the first device based on one or more chat messages transmitted in the first online chat session, wherein the initiating the first process flow comprises assigning a first state to a state attribute of the first process flow;

configuring a chat object for the first account based on the first process flow and the first state, wherein the chat object stores data associated with the first account and the first process flow in a data structure of the chat object, and includes programming instructions configured to perform actions within the first online chat session based on the data stored in the data structure of the chat object;

inserting the chat object into a first chat flow of the first online chat session, wherein the chat object is configured to perform the actions within the first online chat session based on the data stored in the data structure, the actions comprising prompting a user of the first chat client for an input via a first interactive presentation rendered on the first chat client as part of the first online chat session based on the first state of the first process flow, receiving the input from the user via the first interactive presentation, masking at least a portion of the input, and presenting the masked data via a second interactive presentation rendered on the second chat client as part of the first online chat session based on the first state of the first process flow and the input;

while the masked input is presented on the second chat client via the second interactive presentation, performing a first process associated with the first process flow based on the input and updating the state attribute of the first process flow from the first state to a second state, wherein the performing the first process comprises retrieving one or more records associated with the first account based at least in part on the at least the portion of the input;

presenting, on the second chat client via the second interactive presentation, the one or more records associated with the first account; and storing the updated state attribute of the first process flow as updated data in the data structure of the chat object.

16. The non-transitory machine-readable medium of claim 15, wherein the assigning the first state includes selecting one of a plurality of states associated with the first process flow.

17. The non-transitory machine-readable medium of claim 15, wherein the operations further comprise:
determining that a second online chat session has been established with the first chat client; and
inserting the chat object into a second chat flow of the second online chat session, wherein the chat object is further configured to render, based on the updated data stored in the data structure of the chat object, a third interactive presentation on the first chat client as part of the second online chat session.

18. The non-transitory machine-readable medium of claim 17, wherein the third interactive presentation includes a status indicator for presenting the updated state of the first process flow.

19. The non-transitory machine-readable medium of claim 15, wherein the second interactive presentation includes a link that enables the second chat client to retrieve additional information associated with the first account.

20. The non-transitory machine-readable medium of claim 15, wherein the operations further comprise:
deriving a context of the first online chat session based on the one or more chat message; and
selecting, from a plurality of process flows, the first process flow based on the context derived from the one or more chat messages.

21. The non-transitory machine readable-medium of claim 15, wherein the chat object is further configured to modify the first interactive presentation based on the input and the updated state of the first process flow.

* * * * *